US012785874B2

(12) United States Patent
Karjalainen et al.

(10) Patent No.: US 12,785,874 B2
(45) Date of Patent: Nov. 3, 2026

(54) USER EQUIPMENT, NETWORK EQUIPMENT, METHODS AND COMPUTER PROGRAMS FOR CONTROLLING UPLINK SOUNDING REFERENCE SIGNALS TO MULTIPLE TRANSMISSION RECEPTION POINTS

(71) Applicant: Nokia Technologies Oy, Espoo (FI)

(72) Inventors: Juha Pekka Karjalainen, Oulu (FI); Sami-Jukka Hakola, Oulu (FI); Hiromasa Umeda, Tokyo (JP); Mihai Enescu, Espoo (FI); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 18/684,617

(22) PCT Filed: Oct. 11, 2021

(86) PCT No.: PCT/EP2021/078014

§ 371 (c)(1),
(2) Date: Feb. 16, 2024

(87) PCT Pub. No.: WO2023/061549

PCT Pub. Date: Apr. 20, 2023

(65) Prior Publication Data

US 2024/0356695 A1 Oct. 24, 2024

(51) Int. Cl.
*H04L 5/00* (2006.01)

(52) U.S. Cl.
CPC .......... *H04L 5/0035* (2013.01); *H04L 5/0023* (2013.01); *H04L 5/0048* (2013.01)

(58) Field of Classification Search
CPC .... H04L 5/0035; H04L 5/0023; H04L 5/0048
See application file for complete search history.

(56) References Cited

U.S. PATENT DOCUMENTS

2021/0329508 A1* 10/2021 Gopal .................. H04W 48/16
2022/0166587 A1* 5/2022 Go ........................ H04L 1/1864
2023/0147639 A1* 5/2023 Go ........................ H04B 7/061
455/101

(Continued)

FOREIGN PATENT DOCUMENTS

WO 2020/197357 A1 10/2020
WO 2021/159493 A1 8/2021
WO 2021/205921 A1 10/2021

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

(Continued)

*Primary Examiner* — Abdelnabi O Musa
(74) *Attorney, Agent, or Firm* — Lippes Mathias LLP

(57) ABSTRACT

User equipment comprising: means configured to: report, to a network, antenna-switching configurations for the user equipment: receive, from the network, a configuration of sounding reference signal (SRS) resources; and transmit, in parallel, a first SRS using a first SRS resource of the SRS resources to a first transmission-reception point (TRP) and a second SRS of the SRS resources using a second SRS resource to a second TRP.

20 Claims, 7 Drawing Sheets

(56) References Cited

U.S. PATENT DOCUMENTS

| | | | | |
|---|---|---|---|---|
| 2023/0171766 A1* | 6/2023 | Lin | H04L 5/0035 370/329 | |
| 2023/0179370 A1* | 6/2023 | Wang | H04L 5/0094 370/329 | |
| 2023/0284287 A1* | 9/2023 | Kung | H04L 5/0023 370/329 | |
| 2023/0309089 A1* | 9/2023 | Kim | H04L 5/0023 | |
| 2024/0039587 A1* | 2/2024 | Liu | H04B 7/0478 | |
| 2024/0187176 A1* | 6/2024 | Wang | H04B 7/0404 | |

OTHER PUBLICATIONS

"3rd Generation Partnership Project; Technical Specification Group Radio Access Network; NR; Physical layer procedures for data (Release 16)", 3GPP TS 38.214, V16.7.0, Sep. 2021, pp. 1-172.

"3rd Generation Partnership Project; Technical Specification Group Radio Access Network; NR; User Equipment (UE) radio access capabilities (Release 16)", 3GPP TS 38.306, V16.6.0, Sep. 2021, pp. 1-155.

"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.

International Search Report and Written Opinion received for corresponding Patent Cooperation Treaty Application No. PCT/EP2021/078014, dated Jul. 4, 2022, 19 pages.

* cited by examiner

USER EQUIPMENT, NETWORK EQUIPMENT, METHODS AND COMPUTER PROGRAMS FOR CONTROLLING UPLINK SOUNDING REFERENCE SIGNALS TO MULTIPLE TRANSMISSION RECEPTION POINTS

RELATED APPLICATION

This application was originally filed as PCT Application No. PCT/EP2021/078014 on Oct. 11, 2021, which is incorporated herein by reference in its entirety.

TECHNOLOGICAL FIELD

Embodiments of the present disclosure relate uplink sounding reference signal management using multiple transmission reception points (TRP).

BACKGROUND

This disclosure is related to, for example, 3GPP New Radio (NR) physical layer design for multiple input multiple output (MIMO) enhancements in Rel-17 and beyond.

Latency associated with uplink (UL) sounding reference signal (SRS) based UL CSI or DL CSI acquisition in multi transmission reception point (TRP) deployments.

Since NR Rel-15 UEs can be equipped with multiple RX antenna panels associated with multiple antenna elements. Depending on UE reception capability, a set of UE antenna panels can be simultaneously used for reception.

Rel-15 UL SRS resource configuration with antenna switching can provide only support for UEs equipped with 4 RX antenna ports.

In Rel-15, depending on reported UE's antenna-switching capability, the UE can be configured with one of a number of antenna-switching configurations: xTyR, where x and y define the number of transmission antenna ports and reception antenna ports at the UE-side, respectively. The indicated UE antenna switching capability of 'xTyR' corresponds to a UE, capable of SRS transmission on 'x' antenna ports over total of 'y' antennas, where 'y' corresponds to all or subset of UE receive antennas.

In NR Rel-15, the UE shall expect to be configured with UL SRS antenna-switching resource configuration xTyR, using a SRS resource set that has y/x SRS resources transmitted in different symbols, at least one SRS associated with x different UE antenna ports.

To transmit to different TRPs, different sequential SRS resource sets are used. If a particular antenna-switching configuration has insufficient SRS resource sets, then the antenna-switching configuration is reconfigured which takes time and additional signaling.

This is sub-optimal.

BRIEF SUMMARY

According to various, but not necessarily all, embodiments there is provided examples as claimed in the appended claims.

According to some examples, the user equipment comprises:

means configured to:

report, to a network, antenna-switching configurations for the user equipment that are candidate antenna-switching resource set combinations for simultaneous uplink transmission;

receive, from the network, a configuration of sounding reference signal (SRS) resources; and transmit, in parallel, a first SRS using a first SRS resource of the SRS resources to a first transmission-reception point (TRP) and a second SRS of the SRS resources using a second SRS resource to a second TRP.

According to some examples, the user equipment comprises:

means configured to:

report, to a network, antenna-switching configurations for the user equipment;

receive, from the network, a configuration of sounding reference signal (SRS) resources; and transmit a first SRS using a first SRS resource of the SRS resources to a first transmission-reception point (TRP) and a second SRS of the SRS resources using a second SRS resource to a second TRP.

According to some examples, the user equipment comprises:

means configured to:

report, to a network, antenna-switching configurations for the user equipment; that are candidate antenna-switching resource set combinations for simultaneous uplink transmission;

receive, from the network, a configuration of sounding reference signal (SRS) resources in a time domain and a frequency domain; and transmit, in parallel, a first SRS using a first SRS resource of the SRS resources to a first transmission-reception point (TRP) and a second SRS of the SRS resources using a second SRS resource to a second TRP.

According to some examples, the user equipment comprises:

means configured to: report, to a network, candidate antenna-switching for simultaneous transmission to multiple TRPs and/or measurement results for the purpose of spatial direction association user equipment and TRPs.

According to various, but not necessarily all, embodiments there is provided examples as claimed in the appended claims.

The above-described examples, perform antenna-switching of different antenna panels towards the spatial direction of multiple TRPs. The user equipment is configured with multiple SRS resource sets in a substantially same slot and/or time instance.

This enables sequential (time consecutive), parallel (substantially same time slot) or simultaneous (substantially same symbol duration) transmission with multiple antenna panels to different TRPs. This can reduce latency and reduce signaling overhead as well as maintain channel state information quality in DL and/or UL between the user equipment and transmission-reception points even when the user equipment changes location and/or orientation.

In at least some examples, the network is informed explicitly or implicitly of which of the different supported antenna-switching SRS resource configurations are or should be associated with the different TRPs. This can be triggered by the network or can be triggered by the user equipment, for example, in response to detection of a change in position/orientation of the user equipment or a change in channel state information quality.

BRIEF DESCRIPTION

Some examples will now be described with reference to the accompanying drawings in which.

ACRONYMS & DEFINITIONS

3GPP: Third Generation Partnership project
AP: antenna port
AS: antenna switching
DCI: downlink control information
DL: downlink
L1: Layer 1 (PHS Layer)
MAC: Medium Access Control
NR: New Radio
NZP-CSI-RS: non-zero-power channel state information reference signal
PDSCH: physical downlink shared channel
PRB: physical resource block
PHR: power headroom report
PUCCH: physical uplink control channel
PUSCH: physical uplink shared data channel
QCL: quasi-co-location
RRC: Radio Resource Control
RSRP: reference signal received power
SRS: uplink sounding reference signal
SRI: sounding reference signal resource indicator
TRP: transmission-reception point
UL: uplink

DETAILED DESCRIPTION

Figure 1:
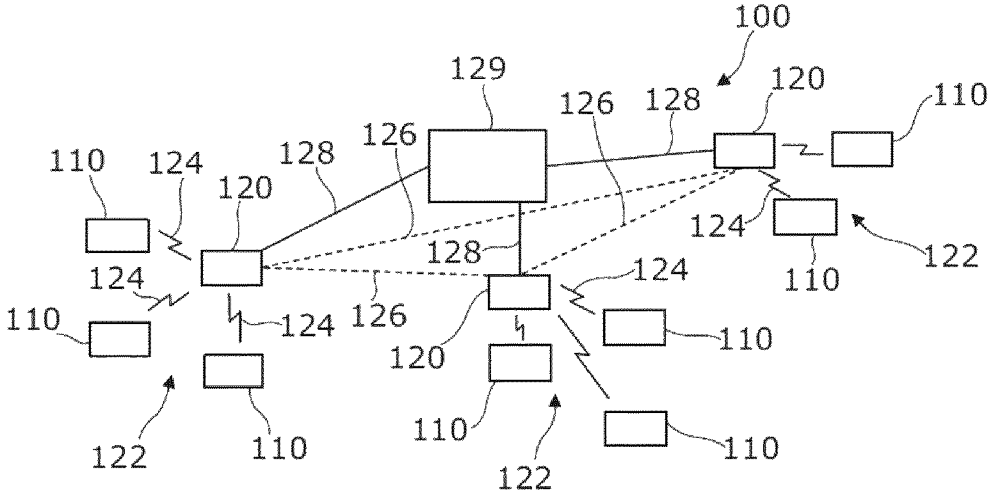
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 at least one served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

A user equipment comprises a mobile equipment. Where reference is made to user equipment that reference includes and encompasses, wherever possible, a reference to mobile equipment.

A network equipment comprises some part of or all of any of a core node 129 and/or an access node 120.

A Transmission-Reception Point (TRP) is a set of geographically co-located antennas (e.g. antenna panel with one or more antenna elements) supporting Transmission Point (TP) and/or Reception Point functionality. TRPs can include antennas of access nodes 120, remote radio heads, a remote antenna of an access node 120, an antenna of a Positioning Reference Signal (PRS)-only TP, etc. One cell can be formed by one or multiple TRP. For convenience, a TRP will be referenced as TRP 120.

In the following description a class can be referenced using a reference number without a subscript index and a particular instance or example in the class can be referenced using a reference number with a particular subscript index.

In the following description reference to an antenna panel 10 is also reference to an antenna port.

Figure 2:
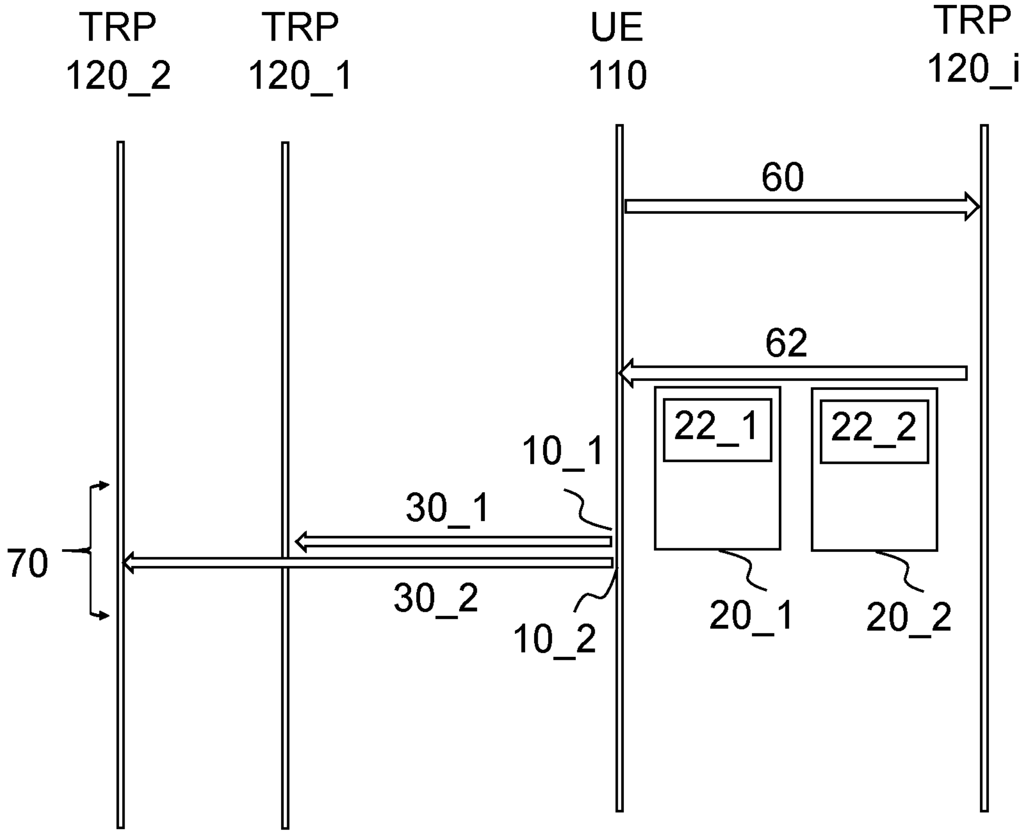
FIG. 2 shows another example of the subject matter described herein.

FIG. 2 illustrates an example of user equipment 110 comprises means configured to:

transmit report 60, to a network 100, SRS antenna-switching configurations for the user equipment;

receive, from the network 100, a configuration 62 of SRS resources 22 for locating sounding reference signals 30 in a time domain and a frequency domain; and use a configured first SRS resource 22_1 to transmit a first SRS 30_1 to a first TRP 120_1 and use a configured second SRS resource 22_2 to transmit a second SRS 30_2 to the second TRP 120_2

In this and other examples, network 100 communicates 60, 62 with the user equipment 110. This communication is via one or more TRPs 120_*i*. The TRP or TRPs 120_*i* can be same as or different to the TRPs 120_1, 120_2 to which the user equipment transmits SRSs 30.

In this example, the user equipment 110 comprises: multiple antenna panels 10, including a first antenna panel 10_1 and a second antenna panel 10_2 different to the first antenna panel 10_1, for communicating with a plurality of transmission-reception points 120 (TRP 120), including a first TRP 120_1 and a second TRP 120_2 different to the first TRP 120_1.

The first antenna panel 10_1 supports one or more sounding reference signal (SRS) antenna-switching configurations of antenna ports 12 of the first antenna panel 10_1 and the second antenna panel 10_2 supports one or more SRS antenna-switching configurations of antenna ports 12 of the second antenna panel 10_2.

The user equipment 110 comprises means configured to:

transmit report 60, to a network 100, SRS antenna-switching configurations for the multiple antenna panels 10;

receive, from the network 100, a configuration 62 of SRS resources 22 for locating sounding reference signals 30 in a time domain and a frequency domain; and use a configured first SRS resource 22_1 appropriate to the antenna-switching configuration of a first antenna panel 10_1 to transmit a first SRS 30_1 to the first TRP 120_1 and use a configured second SRS resource 22_2 appropriate to an antenna-switching configuration of the second antenna panel 10_2 to transmit a second SRS 30_2 to the second TRP 120_2.

The user equipment 110 can use the configured first SRS resource 22_1 appropriate to the antenna-switching configuration of the first antenna panel 10_1 to transmit a first SRS 30_1 to the first TRP 120_1 in a first time slot 70 and use a configured second SRS resource 22_2 appropriate to an antenna-switching configuration of the second antenna panel 10_2 to transmit a second SRS 30_2 to the second TRP 120_2 in the first time slot 70.

The first period of time is a first time slot 70. The transmission of the first SRS 30_1 to the first TRP 120_1 is parallel with (but not necessarily simultaneous with) the transmission of the second SRS 30_2 to the second TRP 120_2.

Figure 3:
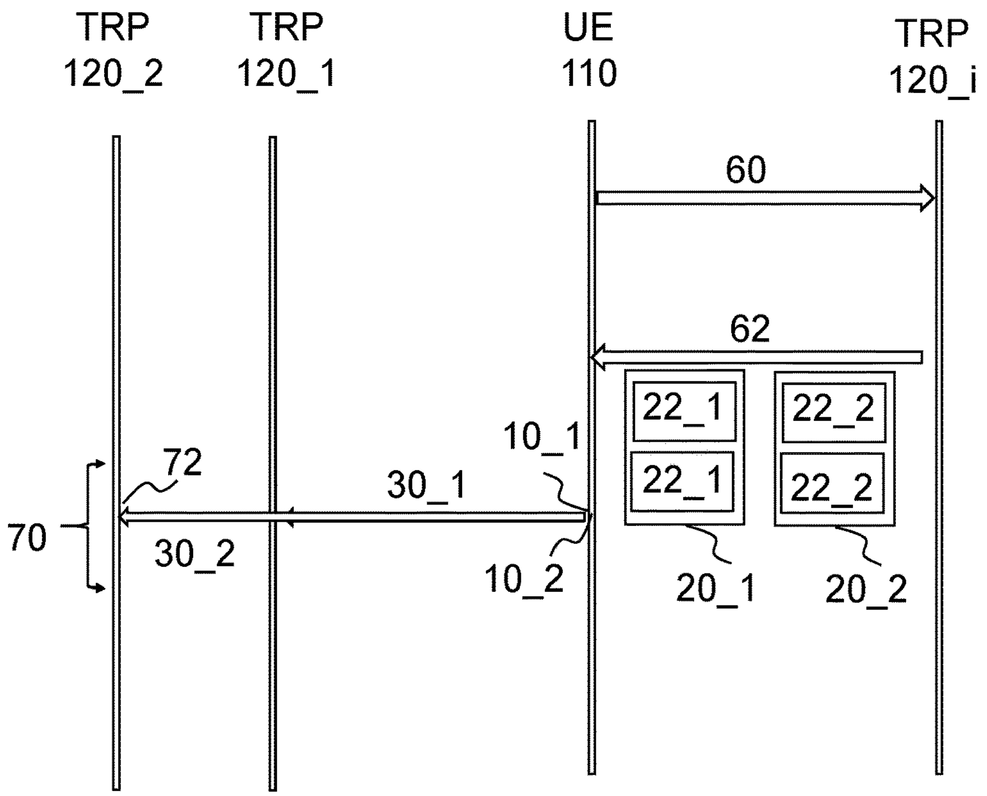
FIG. 3 shows another example of the subject matter described herein.

FIG. 3 is similar to FIG. 2, it is different in that the first period of time is a first-time instance 72 in a first time slot 70. The transmission of the first SRS 30_1 to the first TRP 120_1 is simultaneous with the transmission of the second SRS 30_2 to the second TRP 120_2.

An antenna panel 10 is a portion of an apparatus, for example user equipment 110, comprising one or more different antenna arrangements. An antenna arrangement comprises one or more antenna elements. Antenna arrangements can use separated channels (e.g. separated in frequency, time, polarization, spatially . . . ). In some examples, the antenna panel comprises an array of antenna elements suitable for beamforming.

The configured UL SRS resources 22 are optimized for the reported antenna-switching configurations of the multiple antenna panels 10, and include different SRS resource sets 20 for different antenna panels 10. The configured first SRS resource 22_1 is appropriate to the antenna-switching configuration of the first antenna panel 10_1 (but not necessarily appropriate to the antenna-switching configuration of the second antenna panel 10_2). The configured second SRS resource 22_2 is appropriate to the antenna-switching configuration of the second antenna panel 10_2 (but not necessarily appropriate to the antenna-switching configuration of the first antenna panel 10_1).

The first UL SRS resource 22_1 is configured within a first SRS resource set 20_1. The second UL SRS resource 22_2 is configured within a second SRS resource set 20_2.

The report 60 transmitted, to the network 100 via a serving TRP 120, comprises the UL SRS antenna-switching configurations for the multiple antenna panels 10. The report can for example comprises, either explicitly or implicitly, one or more of:

an indication of a maximum supported SRS antenna-switching configuration for each of some or all of the multiple antenna panels 10;

an indication of supported simultaneous SRS antenna switching configurations for each of some or all of the multiple antenna panels 10; or an indication of one or more SRS antenna-switching configurations for each of some or all of the multiple antenna panels 10.

Additionally, the report may also include capability on simultaneous transmission capability of antenna panels towards different spatial transmission directions, e.g. how many different spatial directions, e.g. TRPs, the UE can transmit simultaneous.

An antenna-switching configuration can be expressed as xTyR indicating an antenna-switching configuration for y reception antenna ports 12 and x transmission antenna ports 1.

If the first antenna panel 10_1 has an antenna-switching configuration $x_1Ty_1R$, indicating an antenna-switching configuration for $y_1$ reception antenna ports 12 and $x_1$ transmission antenna ports 12, then a configured first SRS resource set 20_1 is associated with $y_1$ antenna ports 12 of the first antenna panel 10_1. The first SRS resource set 20_1 comprises $y_1/x_1$ first SRS resources 22_1 at least one for association with different $x_1$ antenna ports 12 of the first antenna panel 10_1.

If the second antenna panel 10_2 has an antenna-switching configuration $x_2Ty_2R$, indicating an antenna-switching configuration for $y_2$ reception antenna ports 12 and $x_2$ transmission antenna ports 12, then a configured second SRS resource set 20_2 is associated with $y_2$ antenna ports 12 of the second antenna panel 10_2. The second SRS resource set 20_2 comprising $y_2/x_2$ second SRS resources 22_2 at least one for association with different $x_2$ antenna ports 12 of the second antenna panel 10_2.

The user equipment 110 is assumed to use a different set of UE TX antenna ports when different SRS resources 22 are used with the SRS resource set 20. SRS resource sets 20_1, 20_2 specify independent time slots 70, which in the example of FIGS. 1 and 2 are synchronised.

SRS resources 22 associated with an SRS resource set 20 specify time instances 72 within the respective time slot 70. When the resource type (i.e. time domain behaviour of SRS resource configuration) of resource set is aperiodic, slot offset parameter common for all or some resources within the resource set defines an offset in number of slots between the triggering DCI and transmission of the UL SRS set. Otherwise (with periodic or semi-persistent resource types), periodicity and slot is a resource specifically configured. For all or some resource types, resource specific resource mapping defines the position of the symbols and the number of symbols in the slot. In the example of FIG. 2, aperiodic SRS resource sets 20_1, 20_2 specify independently the substantially same time slot 70, and SRS resources 22_1, 22_2 specify the substantially same time instance 72 in that substantially same time slot 70.

For an antenna-switching configuration xTyR x is a transmission antenna ports per resource in SRS resource sets 20, y is reception antenna ports number of SRS resources 22 in a SRS Resource set 20. In some examples, x can be >2, for example x can be a member of the set {1, 2, 4} or higher.

In some examples, y can be >4, for example y can be a member of the set {1, 2, 4, 6, 8} or higher. However, y is greater then or equal to x.

Figure 4:
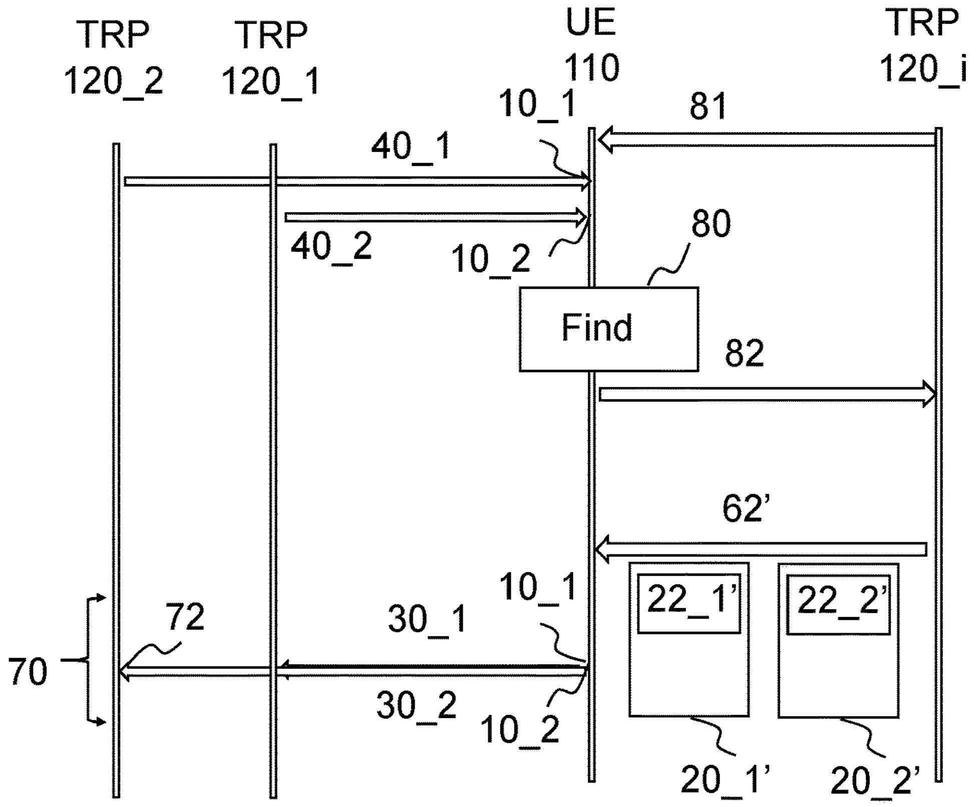
FIG. 4 shows another example of the subject matter described herein.
Figure 5:
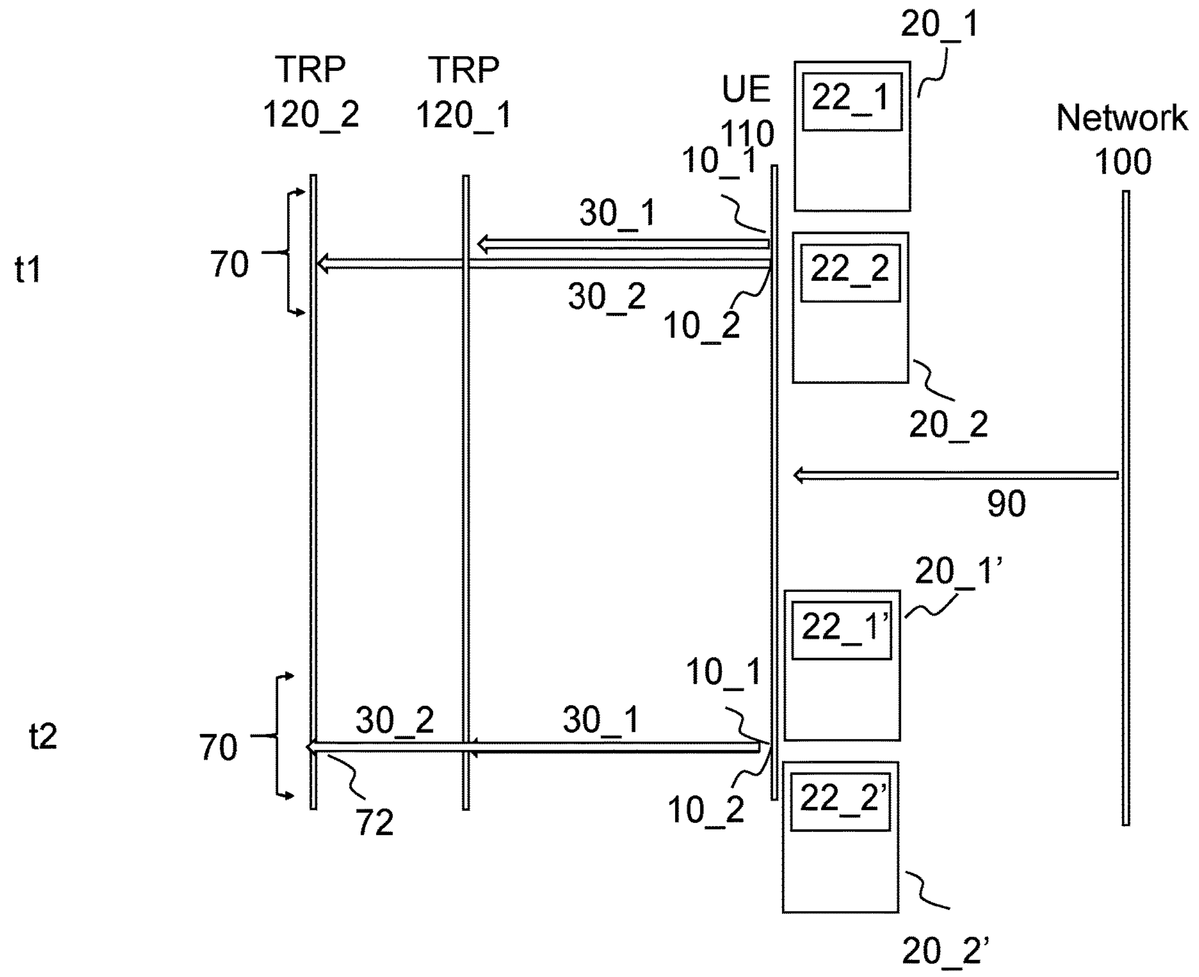
FIG. 5 shows another example of the subject matter described herein.

FIGS. 4 and 5 illustrate different example of updating SRS resources 22 appropriate to the antenna-switching configurations of the antenna panels 10.

This can be performed dynamically.

In at least some examples, the user equipment 110 is configured to:

update the first SRS resource 22_1 appropriate to the antenna-switching configuration of a first antenna panel 10_1 to transmit to a TRP different to the first TRP 120_1 in a time period and/or update the second SRS resource 22_2 appropriate to an antenna-switching configuration of the second antenna panel 10_2 to transmit to a TRP different to the second TRP 120_2 in the substantially same time period, wherein the time period is a time slot or a symbol duration within a time slot.

In FIG. 4 it is performed when a mapping between antenna panels 10 and TRP 120 changes. Different combinations of antenna panel 10 and TRP 120 are or should be mapped together. The updating of SRS resources 22 appropriate to the antenna-switching configurations of the antenna panels 10 is responsive to the change in mapping.

In FIG. 5 it is performed to achieve synchronization between antenna panels 10 using different TRPs 120. The dynamic updating of SRS resources 22 appropriate to the antenna-switching configurations of the antenna panels 10 causes relative time shifts between the SRS resources 22 of different antenna panels 10 which can be used to control SRS transmission to multiple TRPs 120 to be within the substantially same slot 70 or at the substantially same time instance 72 within the substantially same slot 70.

Referring to FIG. 4, the user equipment 110 is configured to:

find 80 a preferred TRP 120 for the first antenna panel 10_1 and identify 82 the preferred TRP 120 to the network 100;

receive, from the network 100, an updated configuration 62' of SRS resources 22 for locating sounding reference signals 30 in a time domain and a frequency domain; and then use an updated first SRS resource 22_1 appropriate to the antenna-switching configuration of the first antenna panel 10_1 to transmit to the preferred TRP in a time period and use a configured second SRS resource 22_2 appropriate to an antenna-switching configuration of the second antenna panel 10_2 to transmit to the second TRP 120_2 in the substantially same time period.

In at least some examples, the UE 110 receives from the network 100 receive, from the network 100 spatial Relation information The processing of finding 80 can, for example, be performed by searching through the possible combinations to find the optimum combinations of UL SRS resource set 20 and UL SRS Resource Config xTyR per TRP 120.

In this and other examples. network 100 communicates 82, 62' with the user equipment 110. This communication is via one or more TRPs 120_*i*. The TRP or TRPs 120_*i* can be the same as or different to the TRPs 120_1, 120_2 to which the user equipment transmits SRSs 30.

As before the time period can be the substantially same slot 70 or the substantially same time instance 72 within the substantially same slot 70.

This can be expanded to multiple antenna panels 10. In at least some examples, the user equipment 110 is configured to:

find a preferred TRP 120 for the first antenna panel 10_1 and identify the preferred TRP 120 to the network 100;

find a preferred TRP 120 for the second antenna panel 10_2 and identify the preferred TRP 120 to the network 100; and receive, from the network 100, an updated configuration of SRS resources 22 for locating sounding reference signals in a time domain and a frequency domain;

use an updated first SRS resource 22_1 appropriate to the antenna-switching configuration of a first antenna panel 10_1 to transmit to the preferred TRP for the first antenna panel 10_1 in a time period and use an updated second SRS resource 22_2 appropriate to an antenna-switching configuration of the second antenna panel 10_2 to transmit to the preferred TRP for the second antenna panel 10_2 in the substantially same time period.

As before the time period can be the substantially same slot 70 or the substantially same time instance 72 within the substantially same slot 70.

In these examples, the updated configuration of SRS resources 22 received from the network 100 can comprise the updated first SRS resource 22_1 and the updated second SRS resource 22_2 and/or can comprise parameters that enable the user equipment to modify an existing SRS resource 22 to create the updated first SRS resource 22_1 and/or modify an existing SRS resource 22 to create the updated second SRS resource 22_2.

In some but not necessarily all examples, the user equipment 110 is configured to use the antenna panels 10 to perform measurements on downlink signals 40_1, 40_2 from different TRPs 120_1, 120_2 to find a preferred TRP and configured to identify 82 the preferred TRP to the network 100 in association with an SRS resource appropriate to the antenna-switching configuration of the first antenna panel 10_1 and/or in association with the antenna-switching configuration of the first antenna panel 10_1.

The downlink signals 40_1, 40_2 can be configured by the network using spatialRelationinfo that defines spatial relation between a DL reference RS 40 and the target SRS, where reference RS 40 can be NZP-CSI-RS or SSB or another UL SRS.

In some but not necessarily all examples, the antenna panels 10 perform measurements on a preconfigured pool of downlink reference signal resources 40 for at least one antenna panel 10. The identification 82 associates one or more members of the pool of configured DL reference signal resources with a SRS Resource Set ID or SRS resource ID.

In some but not necessarily all example, the user equipment 110 reports 82 UL SRS resource set configuration xTyR for antenna switching with SRS resource set ID with CORESETPoolIndex (or some other logical index representing TRP 120)

The communication 82 can be communicated via RRC/MAC/L1 signalling. The communication 82 can be performed when prompted by DCI.

Referring to FIG. 5, the user equipment 110 is configured to time shift SRS resources 22 to achieve simultaneity between SRS resources 22' used by different antenna panels 10 for different TRP in response to receiving a medium access control (MAC) control element (CE) 90 that specifies time shifts.

In FIG. 5, at a first time Referring to FIG. 5, the user equipment 110 is configured to use SRS resources 22 to without any or without strict control of timing of SRS resources 22 used by different antenna panels 10 for different TRP. The user equipment 110 is configured to modify SRS resources 22, in response to receiving a medium access control (MAC) control element (CE) 90 that specifies time shifts to control timing of SRS resources 22 used by different antenna panels 10 for different TRP. In the example illustrated, but not necessarily all examples, the user equipment 110 responds to the MAC CE 90 to make the updated SRS resources 22' simultaneous, so that transmission of the first and second SRS 3)-1, 30_2 occur simultaneously.

The update to the SRS resources 22' is a relative update. Thus, the timing difference between the first SRS resource 22_1 and the second SRS resource 22_2 changes. To achieve this one or both of the first SRS resource 22_1 and the second SRS resource 22_2 can change to create the updates SRS resources 22'.

In the example illustrated, both of the first SRS resource 22_1 and the second SRS resource 22_2 can change to create an explicitly updated first SRS resource 22_1' and an explicitly updated second SRS resource 22_2'. In other examples, one of the first SRS resource 22_1 and the second SRS resource 22_2 can change to create a relatively updated first SRS resource 22_1' and a relatively updated second SRS resource 22_2'.

Referring back to FIGS. 2 and 3, the network equipment comprises: means for receiving SRS antenna-switching configurations for a user equipment; and means for configuring different SRS resource sets to transmit sounding reference signals to different transmission reference points (TRP).

In some examples, the network equipment comprises means configured for configuring SRS antenna-switching configurations for multiple indices of a user equipment wherein an index (singular of indices) identifies an antenna panel, an antenna entity, a SRS resource set.

In some examples, the network equipment comprises means for configuring different SRS resource sets to transmit sounding reference signals to different transmission reference points (TRP) in a common time period, wherein the common time period is a common time slot or a common time instance within a common time slot.

In some examples, the network equipment comprises:

means for receiving 60 SRS antenna-switching configurations for multiple antenna panels 10 of a user equipment 110; and means for configuring 62 different SRS resource sets 20 for different antenna panels 10 to transmit sounding reference signals 30 in a common time period 70, 72 to different transmission reference points (TRP) 120, wherein the common time period 70, 72 is a common time slot 70 or a common time instance 72 within a common time slot 70.

In at least some examples, the network equipment is configured to optimize SRS resource sets 20, for the different antenna-switching configurations of the multiple antenna panels 10, wherein the optimization assigns different SRS resource sets 20 for different antenna panels 10 with different antenna-switching configurations.

Referring back to FIG. 4, the network is configured to use information 82 associating TRPs 120 with antenna panels 10, to dynamically configure 62' different SRS resource sets 20' for different antenna panels 10 to transmit sounding reference signals 30 in a common time period 70, 72 to different transmission reference points (TRP) 120, wherein the common time period 70, 72 is a common time slot 70 or a common time instance 72 within a common time slot 70.

The information 82 associating TRPs 120 with antenna panels 10 can be received from the user equipment 110.

Referring back to FIG. 5, the network equipment is configured to time shift SRS resources 22 for different antenna panels 10 to achieve simultaneity of transmission of sounding reference signals 30_1, 30_2 to different transmission reference points (TRP) 120_1, 120_2.

Figure 6A:
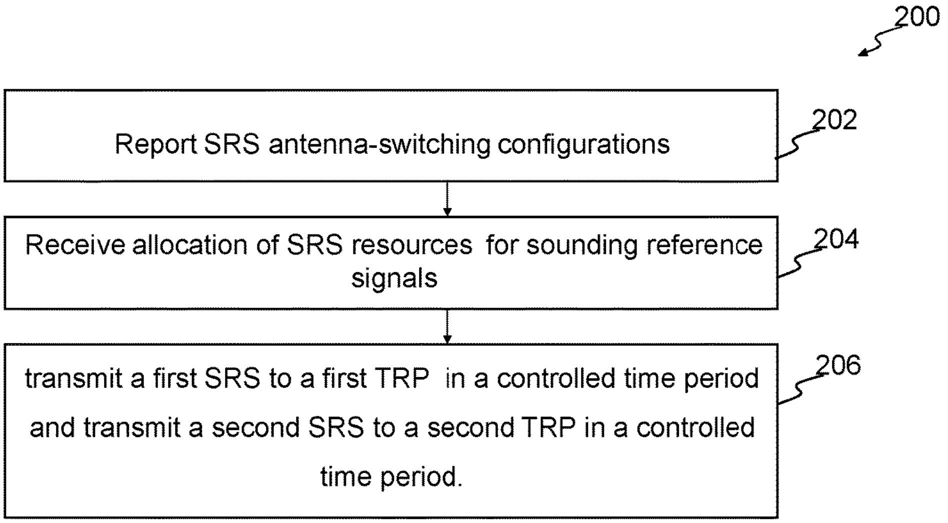
FIG. 6A shows another example of the subject matter described herein.

FIG. 6A illustrates an example of a method 200. The method 200 can, for example, be performed by user equipment 110.

The method 200 comprises, at block 202, reporting, to a network 100, SRS antenna-switching configurations and associated simultaneous transmission capability for multiple antenna panels 10.

The method 200 comprises, at block 204, receiving, from the network 100, a configuration of SRS resources 22 for locating sounding reference signals in a time domain and a frequency domain.

The method 200 comprises, at block 206, using a configured first SRS resource 22_1 appropriate to an antenna-switching configuration of a first antenna panel 10_1 to transmit a first SRS 130_1 to a first TRP 120_1 in a first controlled time period and use a configured second SRS resource 22_2 appropriate to an antenna-switching configuration of a second antenna panel 10_2 to transmit a second SRS 130_2 to the second TRP 120_2 in a second controlled time period, which is some examples can be substantially the same as the first controlled time period. The controlled first and second time periods can be a common time period. The common time period can be a common time slot or a common time instance (symbol duration) within a common time slot.

Figure 6B:
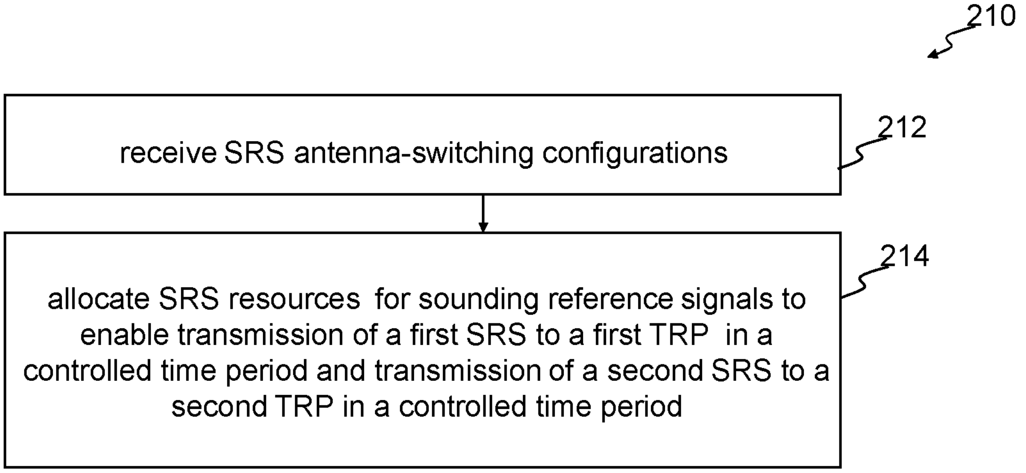
FIG. 6B shows another example of the subject matter described herein.

FIG. 6B illustrates an example of a method 210. The method 21 can, for example, be performed by network equipment.

The method 210 comprises, at block 212, receiving SRS antenna-switching configurations for multiple antenna panels 10 of a user equipment 110. The method 212 comprises, at block 214, configuring different SRS resource sets for different antenna panels 10 to transmit sounding reference signals in controlled time periods to different transmission reference points (TRP), wherein the controlled time periods can be a common time period. The common time period can be a common time slot or a common time instance (symbol duration) within a common time slot.

There is therefore described a system comprising the network equipment as described and one or more user equipment 110 as described.

In the following example, SRS antenna switching is operational, for example SRS antenna switching SRS-ResourceSet.usage=antennaSwitching.

Referring to FIGS. 2 & 3, in some examples the UE 110 shall report maximum supported xTyR antenna switching configuration for at least one antenna panel 10 and the number of antenna panels 10 in the capability report 60, where the maximum refers to the maximum number of TX and RX antenna ports supported per antenna panel 10.

New antenna-panel specific antenna switching capability reporting 60 for simultaneous usage of multiple antenna panels 10 is proposed.

In one embodiment, UL SRS antenna-switching xTyR capability report 60 for simultaneous usage of multiple antenna panels 10 for UL SRS antenna switching purposes is defined. The UE 110 shall report up to N different preferred antenna-switching (xTyR) configurations for at least one simultaneous multi-panel operation option, i.e up to K different simultaneous xTyR options. Based on maximum antenna-panel specific xTyR capability at the UE-side, the UE 110 determines for at least one, k=1 . . . . K, simultaneous transmission options, N different xTyR configuration candidates associated with multiple antenna panels/panel entities, i.e k-tuples of candidate xTyR configurations, where K defines the number of supported different spatial QCL-typeD source for simultaneous transmission (i.e. simultaneousTransmissionDiffTypeD).

For example, UE 110 is equipped with four antenna panels 10 and it supports 3 (K=3) different spatial sources for simultaneous transmission. Different panels 10 support the following xTyR configurations, panel1: 2T2R, panel2: 1T2R, panel3: 1T1R. The network 100 has configured N equal to 3. When the UE 110 indicates 60 that it supports e.g. 2T2R it supports also 1T2R. This applies when x=y and x>1 and y>1. The UE 110 can provide in the capability report 60 the preferred candidate antenna switching configurations as follows:

k=1 (2T2R,-,-,-); (1T2R,-,-,-); (1T1R,-,-,-)

k=2 (2T2R, 1T2R,-,-); (1T2R, 1T2R,-,-); (2T2R, 1T1R,-,-); (1T2R, 1T1R,-,-); (1T1R, 1T1R,-,-)

where '-' defines that antenna panel is not used.

The aim of this reporting 60 is to indicate what kind of antenna-switching candidates with simultaneous transmission and reception associated with multiple antenna panels 10 are supported by the UE 110.

The network 100 does not need to be aware what exact antenna panel 10 is used when any of the reported candidates are configured for the UE 110. So, the detailed antenna panel operation remains transparent for the network 100

Referring to FIG. 4, antenna panels 10 with their xTyR antenna-switching capabilities can be used with UL SRS resources 22 configured with intended TPRs 110.

It can be desirable to dynamically configure the use of UL SRS antenna-switching with different antenna panels 10 with different simultaneous transmission and reception capabilities.

It can be desirable to flexibly configure UL SRS antenna switching configurations that utilize simultaneous multi-panel transmission and reception capability.

FIG. 4 illustrates an example of a new reporting procedure to provide dynamic association between the preconfigured UL SRS resource sets 20 (i.e. panel entities/antenna panels 10) for UL SRS antenna switching and the pool of configured DL RS resource(s).

In one embodiment, UE 110 reports 82 dynamically candidate spatial source DL RS resource(s) and corresponding UL RS resource IDs/set ID that provide dynamic association between the preconfigured UL SRS resource sets 20 (i.e., panel entities/antenna panels 10) for antenna switching and the pool of configured DL RS resource(s).

In alternative approach, the UE 110 reports preferable UL SRS resource set configuration (xTyR) for antenna switching with resource/set ID associated with CORESETPoolIndex or some other logical index representing TRP 120.

The reporting 82 enables the gNB 120 to associate the "correct" spatial source DL RS with the SRS resource set 20.

Reporting can be done via RRC and/or more dynamically via MAC and/or physical layer signaling.

In alternative approach, upon reception of DCI with a codepoint field (e.g. 1-bit) defining request for spatial linkage report 82 between the DL RS and UL SRS for antenna-switching, the UE 110 determines the above defined report 82 and transmits it via PUCCH or PUSCH.

In one implementation example for the dynamic reporting 82 of spatial source DL RSs for UL SRS antenna-switching configuration, the following steps can be considered:

Referring to FIGS. 2 & 3:

UE signals 60 its panel capabilities regarding SRS for panel switching. Panel can be abstracted by providing a list of capabilities where the index refers to a panel entity appearing at the gNB side.

gNB 120 configures UE 110 with the DL RSs to be measured and reported [not illustrated]

gNB 120 configures 62 UE 110 with the SRS resource sets for at least one index provided in the step 1

Referring to FIG. 4:

gNB 120 configures 81 UE 110 to report candidate DL RSs per index (per panel/per SRS resource set)

UE 110 measures the configured DL RSs and determines 80 feasible DL RSs for at least one index (at least one SRS resource set). The UE 110 is linking the configured/measured DL RS indices with the UL SRS resource sets 20 and implicitly with the UL panel information (transparent to the gNB 120).

UE 110 reports 82 the determined feasible DL RSs and UL RSs.

UE 110 receives update 62' of the spatial source DL RS(s) for the SRS resource set 20.

UE transmits the triggered SRS resource set (not illustrated in FIG. 4, but examples illustrated in FIGS. 2 & 3).

The spatial source DL RS resource(s) can be non-zero power channel state information reference signal (NZP-CSI-RS) or synchronization signal block (SSB).

The UL RS resource IDs/set ID" can be UL sounding reference signal resource indicator (SRI), these are UL SRS resource IDs for SRS resources 22 within the UL SRS resource set 20.

At least one of the UL SRS resource sets 20 can be preconfigured with one or more candidate spatial DL RS resource that works as a spatial source for the UL SRS resources 22 within an SRS resource set 20. The UE 110 performs DL RS resources measurements (e.g. L1-RSRP) and selects the strongest one DL RS resource that has a preconfigured association with UL SRS resource 20. After this, the UE reports 82 the selected UL SRS resource set ID or resource ID and corresponding DL RS resource ID.

Figure 7:
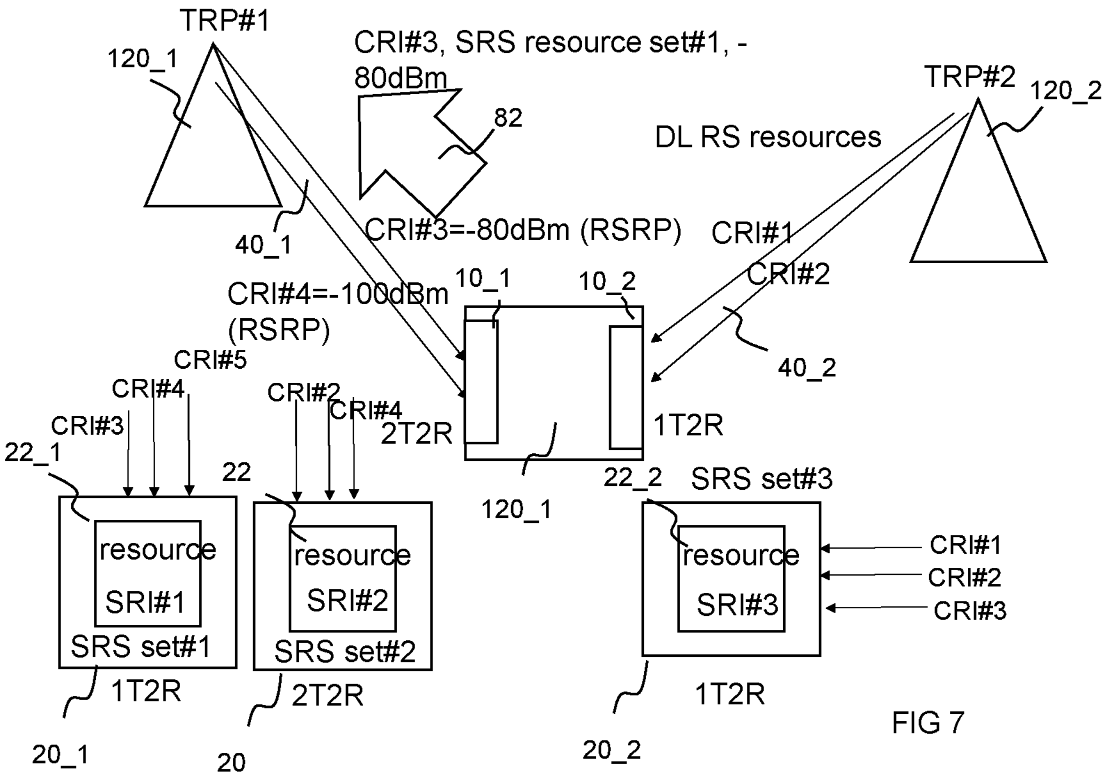
FIG. 7 shows another example of the subject matter described herein.

This is illustrated in more detail in FIG. 7.

The configured first SRS resource 22_1 in the first SRS resource set 20_1 is appropriate to the antenna-switching configuration 2T2R of a first antenna panel 10_1. The SRS resource set 20_1 is preconfigured with candidate spatial DL RS resources (CRI #3, CRI #4, CRI #5,) that works as a spatial source for the first SRS resources 22_1 within the first SRS resource set 20_1. The UE 110 performs DL RS resources measurements (e.g. L1-RSRP) on downlink signals 40_1 (from one or more TRPs) and selects the strongest one DL RS resource that has a preconfigured association with UL SRS resource 20. In this example, CRI #3 and CRI #4 are used by TRP 120_1. CRI #3 has RSRP signal strength −80 dBm and CRI #4 has RSRP signal strength −100 dBm and CRI #5 has no RSRP signal strength. CRI #3 is selected as the strongest. The UE 110 reports 82 the selected UL SRS resource set ID (set #1) or SRS resource ID (SRI #1) and corresponding DL RS resource ID (CRI #3).

The configured second SRS resource 22_2 in the second SRS resource set 20_2 is appropriate to the antenna-switching configuration 1T2R of a second antenna panel 10_2. The second SRS resource set 20_2 is preconfigured with candidate spatial DL RS resources (CRI #1, CRI #2, CRI #3,) that works as a spatial source for the second SRS resources 22_2 within the second SRS resource set 20_2. The UE 110 performs DL RS resources measurements (e.g. L1-RSRP)

on downlink signals 40_2 (from one or more TRPs) and selects the strongest one DL RS resource that has a preconfigured association with the second SRS resource 20_2. In this example, CRI #1 and CRI #2 are used by TRP 120_2. CRI #1 has RSRP signal strength, greater than CRI #2 (and also CRI #3). CRI #1 is selected as the strongest. The UE 110 reports 82 (not illustrated) the selected UL SRS resource set ID (set #3) or SRS resource ID (SRI #3) and corresponding DL RS resource ID (CRI #1).

Subsequently, wither with or without explicit confirmation from the network 100, the UE 110 is configured to use the first strength, SRS resource 22_1 of the first SRS resource set 20_1 (which is appropriate to the antenna-switching configuration of the first antenna panel 10_1) to transmit a first SRS 30_1 to the first TRP 120_1 and use the second first SRS resource 22_2 of the second SRS resource set 20_2 (which is appropriate to the antenna-switching configuration of the second antenna panel 10_2) to transmit a second SRS 30_2 to the second TRP 120_1.

The first strength, SRS 30_1 and the second SRS 30_1, can but do not have to share the substantially same slot 70 or substantially same time instance 72 within a slot 70.

Figure 9:
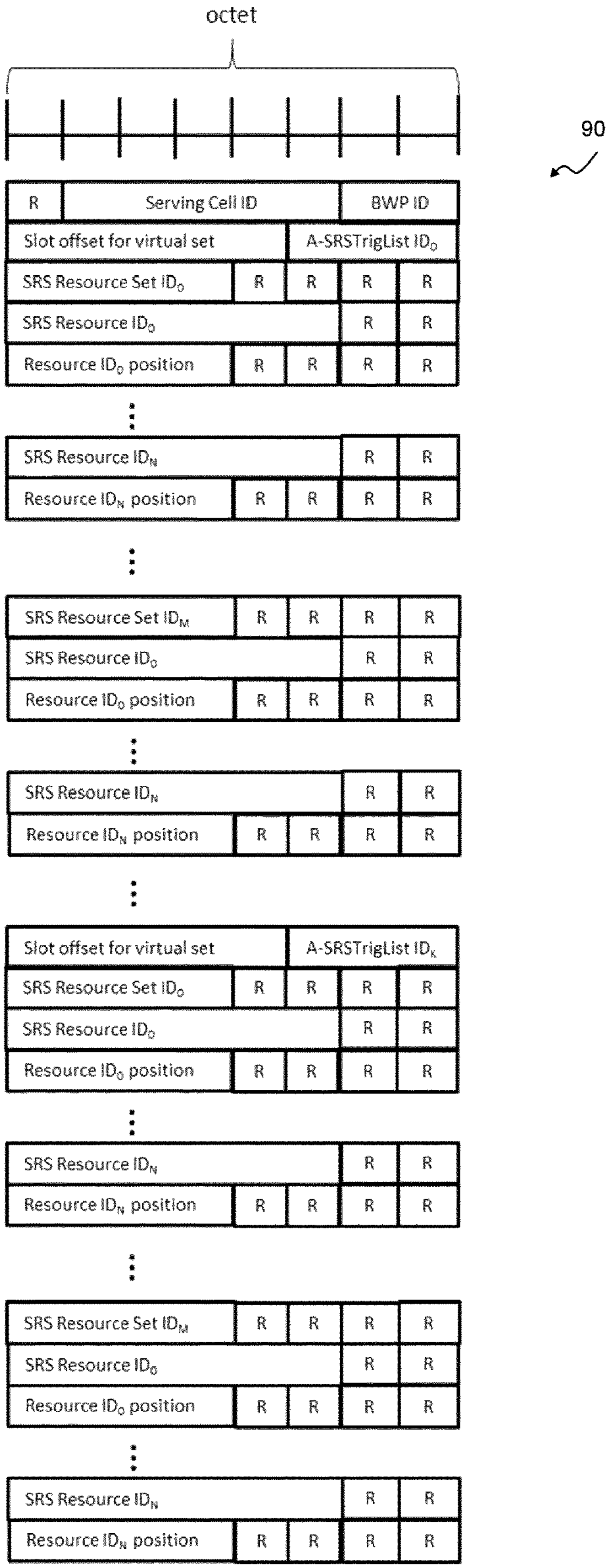
FIG. 9 shows another example of the subject matter described herein.

The measurement-reporting illustrated in FIGS. 4 and 9 therefore has broader application than supporting parallel or simultaneous transmission.

FIG. 5 illustrates an example of dynamic control of timing for simultaneity across TRPs 120. There is time shifting of SRS resources 22 to achieve simultaneity between SRS resources 22 used by different antenna panels 10 for different TRPs 120.

In the following description reference is made to virtual resources set 300. This is a logical collection of SRS resources 22 from across multiple different SRS resource sets 20.

An SRS resource set 20 is associated with a particular panel 10/TRP 120 and has multiple SRS resources 22. At least one resource set 20 is associated with a time slot and at least one SRS resource 22 within a SRS resource set is associated with a different time instance (different symbol) within that slot.

In contrast a virtual resource set 300 is associated with multiple panels 10/TRPs 120 and has SRS resources 22, from different SRS resource sets.

In the example illustrated, the virtual resource set 300 is selected so that its SRS resources 22 are simultaneous, that is at the substantially same time instance within the substantially same time slot.

As illustrated in FIG. 5, a virtual resource set can be identified to a UE 110 using MAC CE 90.

In one embodiment, new “virtual” UL SRS antenna switching resource set(s) indication MAC CE 90 for simultaneous inter-antenna panel antenna switching operation with multiple TRPs is defined.

Based on the UE antenna panel specific capability reports associated with UL SRS xTyR configurations for antenna switching, the network 100 indicates with new MAC CE 90 which of UL SRS resource sets 20 and resource IDs form “virtual” UL SRS antenna switching resource set(s) 300.

The MAC CE 90 indicates also new symbol positions in a slot as well as new slot offset value associated for at least one “virtual” set 300 separately.

The MAC CE 90 also indicates into which aperiodic SRS triggering state new “virtual” UL SRS resource set 20 is associated. With one MAC CE it is possible to indicate and associate multiple “virtual” UL SRS resource sets into a one aperiodic triggering state.

The new MAC CE enables to indicate dynamically different UL SRS antenna switching resource sets such that antenna switching of UE TX antenna ports 12 can be done simultaneously across different multiple antenna panels 10 with different xTyR antenna switching capabilities.

Upon reception of the new MAC CE, the UE shall determine the number of simultaneous transmissions per “virtual” UL resource set based on reported capability of simultaneous transmission per antenna panel 10 as well as symbol positions of the indicated resources.

When multiple simultaneous transmissions are determined for one “virtual” UL resource set 300, the UE shall use slot offset provided in the MAC CE 90 for the first simultaneous transmission. For the rest of the simultaneous transmissions within the single “virtual” UL SRS set 90, the UE 110 shall use the slot-offset values (4 different values) associated the first set are used as relative slot offset values with respect to slot offset provided by the MAC CE.

Otherwise, if multiple “virtual” sets are indicated, slot-offset values are determined by indicated slot offset values in the new MAC CE.

The UE 110 is assumed to change its TX antenna port (s)/pairs between different the new simultaneous multi-panel transmission instants.

When MAC CE associates multiple “virtual” sets into one aperiodic SRS triggering state, the UE 110 shall assume that it changes its TX antenna port(s)/pairs between different “virtual” sets.

FIG. 9 shows an example of proposed MAC CE 90 to configure dynamically multiple virtual UL SRS resource set(s) 20 for simultaneous inter-antenna panel transmission and reception with antenna-switching operation. The proposed MAC CE 90 is defined as follows:

- Serving Cell ID: This field indicates the identity of the Serving Cell or cell with different PCI than the serving cell, which contains activated SRS Resource Set. The length of the field is 5 bits;
- Resource BWP $ID_i$: This field indicates a UL BWP as the codepoint of the DCI bandwidth part indicator field as specified in TS 38.212, on which the resource used for spatial relationship derivation for SRS resource i is located. The length of the field is 2 bits;
- R: Reserved bit, set to 0.
- SRS resource set 20ID: This field indicates the SRS resource set 20ID identified by SRS-ResourceSetId as specified in TS 38.331. The length of the field is 4 bits;
- SRS Resource $ID_i$: This field contains an identifier of the UL SRS resource. The length of the field is 6 bits.
- Slot offset for virtual set: This field indicates the slot offset value for the virtual resource set.
- Resource ID position: The position of the resource within the slot.

Figure 8:
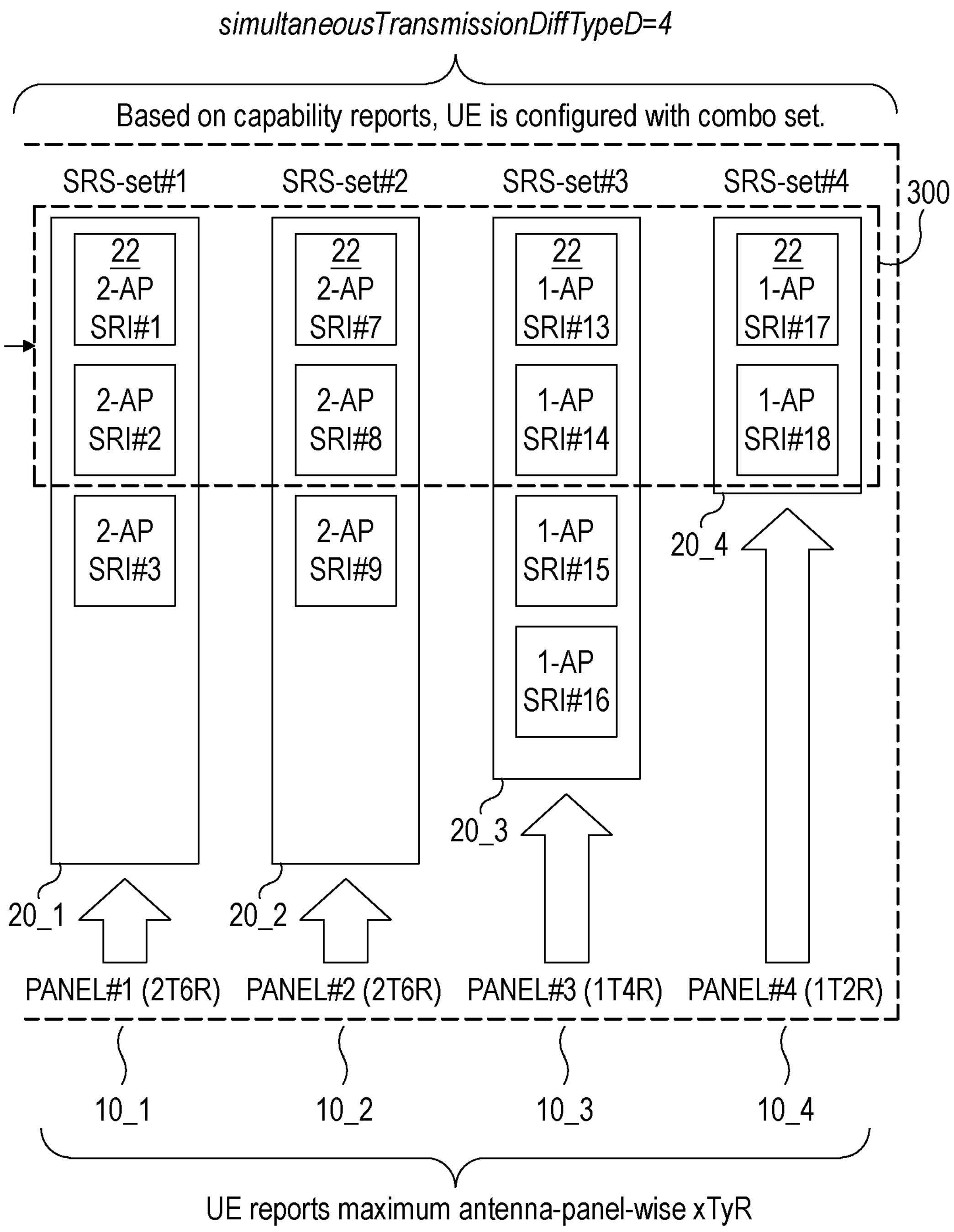
FIG. 8 shows another example of the subject matter described herein.

FIG. 8 shows another example implementation of the proposed disclosure where UE is indicated dynamically with new MAC that indicates “virtual” UL SRS resource set(s) for inter-antenna panel transmission and reception for antenna switching. The UE 110 is equipped with four antenna panels 10 with different antenna switching capabilities, i.e. xTyR, per antenna panel.

As a first step, the UE is assumed to report 60 via RRC capability signalling maximum xTyR antenna-switching per antenna panel or panel entity. As shown, the UE has reported four different antenna-switching capabilities, i.e. 2T6R, 2T6R, 1T4R, 1T2R. Additionally, the UE shall report via RRC capability signalling the number of supported different spatial QCL-typeD for simultaneous transmission, i.e. simultaneous TransmissionDiffTypeD=4.

It is assumed that "correct" spatial source for the UL SRS resources 22 have been configured based on reporting procedure defined in the above example described with reference to FIGS. 4 and 9.

Now, by using the proposed new MAC CE 90, the UE 110 is indicated with single "virtual" SRS resource set 300 for inter-antenna panel antenna switching, where the set is defined over four antenna panels 10 by using resources associated with panel 1: SRI #1, SRI #2 and panel2: SRI #7, SRI #8, panel3 SRI #13, SRI #14 and panel4: SRI #17, SRI #18. According to reported simultaneous transmission capability per antenna panel, the UE 110 determines that the single virtual set 300 defines two different 4: SRI simultaneous transmissions over antenna panels 10 (MAC CE 90 indicates this by using same or different symbol positions for resources).

When only single virtual set 300 is indicated by the MAC CE 90, a slot-offset provided in the MAC CE 90 works as slot-offset for the first simultaneous transmission. For the rest of the simultaneous transmissions within the single "virtual" UL SRS set 300 the slot-offset values (4 different values) associated the first set (i.e SRS-set #1) are used as relative slot offset values with respect to slot offset provided by the MAC CE 90. The first slot offset of UL SRS set #1 works as slot offset for the second simultaneous transmission and second slot offset of UL SRS set #1 works as slots for the third simultaneous transmission, etc.

Otherwise, if multiple "virtual" sets 300 are indicated slot-offset values are determined by indicated slot offset values in the new MAC CE 90. The first simultaneous transmission over multiple antenna panels 10 is done by using the virtual set 300 with resources associated with panel 1: SRI #1 (2-AP), panel 2: SRI #7 (2-AP), panel 3: SRI #13 (1) and panel 4 SRI #17. For the second simultaneous transmission, the UE 110 is assumed to change UE antenna port(s) or antenna-port pairs with respect to the first simultaneous transmission. As a result of the virtual set configuration, the UE can be configured with the following antenna switching configurations: panel1: 2T4R, panel 2: 2T4R, panel 3: 1T2T, panel 4: 1T2R. It is also worth noting that aforementioned configuration allows now simultaneous transmission over different antenna panels 10 towards multiple different TRPs. This is not possible with Rel-15/Rel-17 antenna-switching configurations. The new MAC CE 90 configures also virtual set 300 with aperiodic SRS triggering list state ID. When multiple virtual sets 300 are configured, it is possible to configure them into same or different aperiodic SRS trigger state(s). As a result of this, configured virtual set(s) 300 can be triggered with uplink/downlink DCI with data or without data or CSI.

The intention of the MAC CE 90 is to enable more adaptive "construction" of the virtual set 300 across those different UL SRS sets 20. With proposed MAC CE 90 we can enable from the one configuration multiple different ones, by activating flexibly different resources out of different sets 20 and forming a new "virtual" set 300 that defines the actual transmission set for the UE 110.

For the purpose of this example, let the UE 110 be equipped with four antenna configured, panels 10. The UE 110 has capability to transmit simultaneously up two different spatial directions, i.e. TRPs 120.

The UE has provided xTyR capability report 60 about the preferred candidate antenna switching configurations with simultaneous multi-panel operation as follows (N=2, K=2): k=1: (2T2R,-), (1T2R,-), k=2: (2T2R,1T2R), (1T1R,1T1R).

Based on this information, the UE 110 is pre-configured with two different "combo" UL SRS resource sets 20 across multiple antenna panels enabling simultaneous or non-simultaneous inter-antenna panel switching with antenna switching; 2T2R-1T2R, 1T1R-1T1R, where 2T2R-1T2R means inter-antenna panel antenna switching transmission configuration across antenna panels such that one antenna panel can use 2T2R and other antenna panel 1T2R for simultaneous transmission. 1T1R-1T1R means inter-antenna panel antenna-switching transmission configuration across antenna panels such that one antenna panel can use 1T1R and other antenna panel 1T1R for simultaneous transmission.

The spatial sources for both of the combination sets have been obtained based on reporting procedure defined in the above example described with reference to FIGS. 4 and 9.

Then, the gNB has triggered the transmission of aperiodic combination" L SRS set (i.e. two 1T1T-1T1R UL resource sets with single antenna port resources) via UL DCI.

When two UL resource sets 20 with different spatial sources associated with e.g. DL reference signals of different TRPs, are triggered via DCI simultaneously assigned to substantially same symbol positions in the slot, the UE shall transmit these resources simultaneously in time via multiple antenna panels 10.

Furthermore, the UE 110 shall assume that multiple resource sets are transmitted within the substantially same time slot. Current specification Rel-15/ -17 do not provide support for this kind of procedure.

The main benefits of the disclosure are summarized as follows:

The disclosure enables dynamic reporting 82 of spatial source DL RSs for UL SRS antenna-switching configuration. As result of this, antenna panels 10 with their xTyR antenna-switching capabilities can be used with UL resources configured with intended TPRs (FIG. 4, 9).

Due to proposed dynamic reporting 82 of spatial source DL RS for UL SRS antenna switching configuration, it is possible to dynamically configure the use of UL SRS antenna-switching with different antenna panels 10 with different simultaneous transmission and reception capabilities. This is beneficial, especially, in multi-TRP operation (FIG. 4, 9).

The disclosure enables flexibly configure inter-antenna panel UL SRS antenna switching configurations that utilize simultaneous multi-panel transmission and reception capability. Existing antenna-switching configuration do not provide support this. Therefore, existing UL SRS antenna-switching configurations are not possible to use efficiently in multi-TRP operation in conjunction with multiple antenna panels at the UE-side.

The disclosure can enable system performance gains in terms of latency and resource overhead as well signalling overhead reduction.

In the foregoing examples, the first TRP 120_1 and the second TRP 120_2 can share the substantially same physical cell ID (PCID) or may be have different PCIDs.

There can therefore be intra and/or inter-cell antenna-switching between cells having respective same or different PCID.

Figure 10:
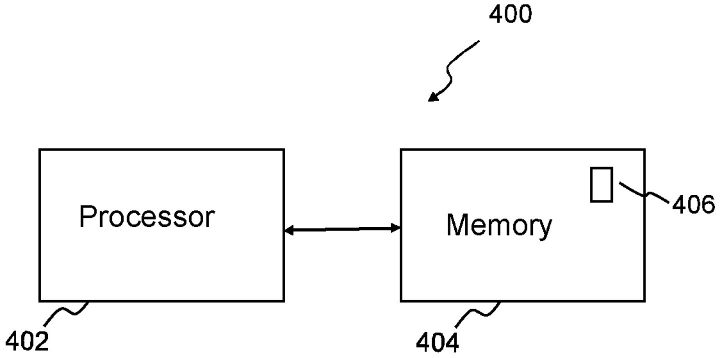
FIG. 10 shows another example of the subject matter described herein.

FIG. 10 illustrates an example of a controller 400. Implementation of a controller 400 may be as controller circuitry. The controller 400 may be implemented in hardware alone, have certain aspects in software including firmware alone or can be a combination of hardware and software (including firmware).

As illustrated in FIG. 10 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 110, 120 when loaded into the processor 402. The computer program instructions, of the computer program 406, provide the logic and routines that enables the apparatus to perform the methods illustrated in some or all of the Figs. The processor 402 by reading the memory 404 is able to load and execute the computer program 406.

The apparatus 110 therefore comprises:

at least one processor 402; and at least one memory 404 including computer program code the at least one memory 404 and the computer program code configured to, with the at least one processor 402, cause the apparatus 110, 120 at least to perform:

reporting, to a network 100, SRS antenna-switching configurations for multiple antenna panels 10;

receiving, from the network 100, a configuration of SRS resources 22 for locating sounding reference signals in a time domain and a frequency domain; and using a configured first SRS resource 22_1 appropriate to an antenna-switching configuration of a first antenna panel 10_1 to transmit to a first TRP 120_1 and use a configured second SRS resource 22_2 appropriate to an antenna-switching configuration of a second antenna panel 10_2 to transmit to the second TRP 120_2.

The apparatus 110 therefore comprises:

at least one processor 402; and at least one memory 404 including computer program code the at least one memory 404 and the computer program code configured to, with the at least one processor 402, cause the apparatus 110, 120 at least to perform:

receiving SRS antenna-switching configurations for multiple antenna panels 10 of a user equipment 110; and configuring different SRS resource sets for different antenna panels 10 to transmit sounding reference signals in a common time period to different transmission reference points (TRP), wherein the common time period is a common time slot or a common time instance within a common time slot.

Figure 11:
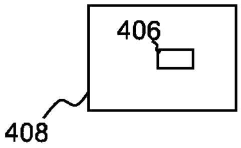
FIG. 11 shows another example of the subject matter described herein.

As illustrated in FIG. 11, the computer program 406 may arrive at the apparatus 110, 120 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 110, 120 may propagate or transmit the computer program 406 as a computer data signal.

Computer program instructions for causing an apparatus 110 to perform at least the following or for performing at least the following:

reporting, to a network 100, SRS antenna-switching configurations for multiple antenna panels 10;

receiving, from the network 100, a configuration of SRS resources 22 for locating sounding reference signals in a time domain and a frequency domain; and using a configured first SRS resource 22_1 appropriate to an antenna-switching configuration of a first antenna panel 10_1 to transmit to a first TRP 120_1 and use a configured second SRS resource 22_2 appropriate to an antenna-switching configuration of a second antenna panel 10_2 to transmit to the second TRP 120_.

Computer program instructions for causing an apparatus 120 to perform at least the following or for performing at least the following:

receiving SRS antenna-switching configurations for multiple antenna panels 10 of a user equipment 110; and configuring different SRS resource sets for different antenna panels 10 to transmit sounding reference signals in a common time period to different transmission reference points (TRP), wherein the common time period is a common time slot or a common time instance within a common time slot.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figs may represent steps in a method and/or sections of code in the computer program 406. The illustration of a particular order to the blocks does not necessarily imply that there is a needed or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising multiple antenna panels, at least one processor, and at least one memory including computer program code, the at least one memory and the computer program code configured to, with the at least one processor, cause the apparatus at least to:
report, to a network, antenna-switching configurations for the apparatus that are candidate antenna-switching resource set combinations for simultaneous uplink transmission;
receive, from the network, a configuration of sounding reference signal (SRS) resources;
transmit, in parallel, a first SRS using a first SRS resource of the SRS resources to a first transmission-reception point (TRP), and a second SRS of the SRS resources using a second SRS resource to a second TRP;

receive, via a medium access control (MAC) control element (CE), an indication of a virtual uplink SRS antenna switching resource set, the virtual resource set being a logical collection of SRS resources from across multiple different SRS resource sets associated with different antenna panels of the apparatus; and determine, based on a reported simultaneous transmission capability per antenna panel and symbol positions of indicated resources, a number of simultaneous transmissions for the virtual resource set.

2. The apparatus as claimed in claim 1, wherein the apparatus is further caused to:

select a preferred TRP for the first SRS resource, and indicate at least the preferred TRP to the network;

receive, from the network, an updated configuration of SRS resources; and transmit an SRS to the preferred TRP using at least part of the updated SRS resources.

3. The apparatus as claimed in claim 1, wherein the virtual resource set is associated with an aperiodic SRS triggering state, and the apparatus is further caused to:

transmit SRS resources of the virtual resource set in response to the virtual resource set being triggered by downlink control information (DCI);

use a slot offset provided in the MAC CE for a first simultaneous transmission of the virtual resource set; and for remaining simultaneous transmissions within the virtual resource set, use slot-offset values associated with a first SRS resource set as relative slot offset values with respect to the slot offset provided by the MAC CE.

4. The apparatus as claimed in claim 1, wherein the apparatus is further caused to change transmit antenna ports or antenna-port pairs between different simultaneous multi-panel transmission instants within the virtual resource set.

5. The apparatus as claimed in claim 1, wherein reporting the antenna-switching configurations comprises reporting, via Radio Resource Control (RRC) capability signalling, a maximum xTyR antenna-switching capability per antenna panel and a simultaneousTransmissionDiffTypeD parameter indicating a number of supported different spatial quasi-co-location typeD sources for simultaneous transmission.

6. The apparatus as claimed in claim 1, wherein the apparatus is further caused to:

receive, via the MAC CE, indications of multiple virtual UL SRS antenna switching resource sets; and when the multiple virtual resource sets are indicated, determine slot-offset values for each virtual resource set from indicated slot offset values in the MAC CE independently for each virtual resource set.

7. An apparatus comprising:

multiple antenna panels, including at least a first antenna panel and a second antenna panel different to the first antenna panel, for communicating with a plurality of transmission-reception points (TRP), including a first TRP and a second TRP different to the first TRP, wherein the first antenna panel supports one or more sounding reference signal (SRS) antenna-switching configurations of antenna ports of the first antenna panel, and the second antenna panel supports one or more SRS antenna-switching configurations of antenna ports of the second antenna panel; and at least one processor, and at least one memory including computer program code, the at least one memory and the computer program code configured to, with the at least one processor, cause the apparatus at least to:

report, to a network, SRS antenna-switching configurations for simultaneous transmission with the multiple antenna panels, the reporting comprising providing, for at least one simultaneous multi-panel operation option, up to N different preferred antenna-switching xTyR configuration candidates associated with the multiple antenna panels as k-tuples of candidate xTyR configurations, where x defines a number of transmission antenna ports, y defines a number of reception antenna ports, and K defines a number of supported different spatial quasi-co-location typeD sources for simultaneous transmission;

receive, from the network, a configuration of SRS resources for locating sounding reference signals in a time domain and a frequency domain, the configuration of SRS resources being based on the reported k-tuples, and wherein detailed antenna panel operation of the apparatus remains transparent to the network; and use a configured first SRS resource appropriate to the antenna-switching configuration of a first antenna panel to transmit to the first TRP, and use a configured second SRS resource appropriate to an antenna-switching configuration of the second antenna panel to transmit to the second TRP.

8. The apparatus as claimed in claim 7, wherein the configured SRS resources for inter-antenna panel antenna-switching are optimized for the reported antenna-switching configurations of the multiple antenna panels, and includes different SRS resource sets for different antenna panels.

9. The apparatus as claimed in claim 7, wherein the apparatus is further caused to use a configured first SRS resource appropriate to the antenna-switching configuration of the first antenna panel to transmit to the first TRP at a first-time period, and use a configured second SRS resource appropriate to an antenna-switching configuration of the second antenna panel to transmit to the second TRP at the first-time period, and wherein the first time period is a common time slot or is a common symbol duration within a common time slot.

10. The apparatus as claimed in claim 7, wherein reporting, to the network, the SRS antenna-switching configurations for simultaneous transmission with the multiple antenna panels comprises:

reporting a maximum supported SRS antenna-switching configuration for the multiple antenna panels;

reporting supported simultaneous SRS antenna switching configurations for the multiple antenna panels; or reporting one or more SRS antenna-switching configurations for at least one of the multiple antenna panels.

11. The apparatus as claimed in claim 7, wherein:

responsive to determining that if the first antenna panel has an antenna-switching configuration $x_1Ty_1R$, indicating an antenna-switching configuration for $y_1$ reception antenna ports and $x_1$ transmission antenna ports, where $x_1$ and $y_1$ are each integers and y is greater than or equal to $x_1$, then a configured first SRS resource set is associated with $y_1$ antenna ports of the first antenna panel, the first SRS resource set comprising $y_1/x_1$ first SRS resources at least one for association with $x_1$ antenna ports of the first antenna panel, and responsive to determining that the second antenna panel has an antenna-switching configuration $x_2Ty_2R$, indicating an antenna-switching configuration for $y_2$ reception antenna ports and $x_2$ transmission antenna ports, where $x_2$ and $y_2$ are each integers and $y_2$ is greater than or equal to $x_2$, then a configured second SRS resource set is associated with $y_2$ antenna ports of the second antenna panel, the second SRS resource set comprising $y_2/x_2$ second SRS resources at least one for association with $x_2$ antenna ports of the second antenna panel, and wherein SRS resource sets specify time slots, and SRS resources associated with an SRS resource set specify time instances within the respective time slot.

12. The apparatus as claimed in claim 7, wherein the apparatus is further caused to:

use the multiple antenna panels to perform measurements on downlink signals from different TRPs to find a preferred TRP for the first antenna panel, and identify the preferred TRP to the network in association with an SRS resource appropriate to the antenna-switching configuration of the first antenna panel and/or in association with the antenna-switching configuration of the first antenna panel;

receive, from the network, an updated configuration of SRS resources for locating sounding reference signals in a time domain and a frequency domain and spatial relation information; and use an updated first SRS resource appropriate to the antenna-switching configuration of a first antenna panel to transmit to the preferred TRP in a time period, and use a configured second SRS resource appropriate to an antenna-switching configuration of the second antenna panel to transmit to the second TRP in the same time period.

13. The apparatus as claimed in claim 7, wherein the apparatus is further caused to:

find a first preferred TRP for the first antenna panel, and identify the first preferred TRP to the network;

find a second preferred TRP for the second antenna panel, and identify the second preferred TRP to the network;

receive, from the network, an updated configuration of SRS resources for locating sounding reference signals in a time domain and a frequency domain and spatial relation information; and use an updated first SRS resource appropriate to the antenna-switching configuration of a first antenna panel to transmit to the first preferred TRP for the first antenna panel in a time period, and use an updated second SRS resource appropriate to an antenna-switching configuration of the second antenna panel to transmit to the second preferred TRP for the second antenna panel in the same time period.

14. The apparatus as claimed in claim 7, wherein the apparatus is further caused to:

dynamically report candidate spatial source downlink reference signal (DL RS) resources and corresponding uplink reference signal resource IDs or set IDs, providing dynamic association between preconfigured UL SRS resource sets for antenna switching and a pool of configured DL RS resources;

perform DL RS resource measurements comprising Layer 1 reference signal received power (L1-RSRP) measurements on the pool of configured DL RS resources from one or more TRPs;

select a strongest DL RS resource having a preconfigured association with a UL SRS resource set; and report the selected UL SRS resource set ID or SRS resource ID and a corresponding DL RS resource ID.

15. The apparatus as claimed in claim 7, wherein the apparatus is further caused to report a UL SRS resource set configuration xTyR for antenna switching with a SRS resource set ID associated with a CORESETPoolIndex or other logical index representing a TRP, communicated via one or more of RRC signalling, MAC signalling, or Layer 1 signalling.

16. The apparatus as claimed in claim 7, wherein the apparatus comprises at least four antenna panels with respectively different antenna-switching capabilities per panel, and the apparatus is further caused to:

report, via RRC capability signalling, a maximum xTyR antenna-switching capability per antenna panel and a simultaneousTransmissionDiffTypeD parameter indicating a number of supported different spatial quasi-co-location typeD sources for simultaneous transmission;

receive, via a MAC CE, an indication of a virtual SRS resource set for inter-antenna panel antenna switching, the virtual SRS resource set being defined over the at least four antenna panels by selecting SRS resources associated with respective antenna panels from respective different SRS resource sets;

determine, based on the reported simultaneous transmission capability per antenna panel and symbol positions of the indicated resources, a number of simultaneous transmissions for the virtual resource set;

transmit, using the virtual resource set, a plurality of simultaneous transmissions over the at least four antenna panels towards multiple different TRPs, wherein the apparatus changes transmit antenna ports or antenna-port pairs between different simultaneous multi-panel transmission instants within the virtual resource set; and wherein the virtual SRS resource set is associated with an aperiodic SRS triggering state and is triggerable via downlink control information (DCI).

17. The apparatus as claimed in claim 7, wherein the apparatus is further caused to:

receive downlink control information (DCI) comprising a codepoint field defining a request for a spatial linkage report between downlink reference signals and uplink SRS for antenna switching; and in response to the DCI, determine the spatial linkage report associating configured downlink reference signal resources with SRS resource set IDs or SRS resource IDs for antenna switching with the multiple antenna panels, and transmit the spatial linkage report via a physical uplink control channel (PUCCH) or a physical uplink shared channel (PUSCH).

18. The apparatus as claimed in claim 7, wherein the apparatus is further caused to:

receive, via DCI, a trigger for transmission of at least two UL SRS resource sets having different spatial sources associated with different TRPs; and responsive to the at least two UL SRS resource sets being assigned to substantially same symbol positions in a slot, transmit the at least two UL SRS resource sets simultaneously in time via the multiple antenna panels towards the different TRPs.

19. The apparatus as claimed in claim 7, wherein the apparatus is further caused to:

receive a configuration of at least two combination UL SRS resource sets across the multiple antenna panels enabling simultaneous or non-simultaneous inter-antenna panel switching with antenna switching, each combination UL SRS resource set defining an inter-antenna panel antenna switching transmission configuration specifying a respective xTyR antenna switching configuration for each of the multiple antenna panels for simultaneous transmission; and transmit, using one of the at least two combination UL SRS resource sets, SRS via the multiple antenna panels according to the respective xTyR antenna switching configuration specified for each antenna panel.

20. An apparatus comprising at least one processor, and at least one memory including computer program code, the at least one memory and the computer program code configured to, with the at least one processor, cause the apparatus at least to:

receive sounding reference signal (SRS) antenna-switching configurations for a user equipment;

configure different SRS resource sets to transmit sounding reference signals to different transmission-reception points (TRP);

indicate, via a medium access control (MAC) control element (CE), which of the different SRS resource sets and SRS resource IDs form a virtual UL SRS antenna switching resource set for simultaneous inter-antenna panel antenna switching operation with multiple TRPs, the MAC CE further indicating new symbol positions in a slot and a new slot offset value associated with the virtual resource set; and associate the virtual UL SRS resource set with an aperiodic SRS triggering state.

* * * * *